US006377347B1

(12) United States Patent
Tuck et al.

(10) Patent No.: US 6,377,347 B1
(45) Date of Patent: Apr. 23, 2002

(54) BELT EDGE SENSOR

(75) Inventors: James W. Tuck, Lyons; Donald R. Laflair, Brighton, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,998

(22) Filed: Jan. 20, 2000

(51) Int. Cl.[7] ................................................ G01N 21/84

(52) U.S. Cl. ....................................... 356/429; 356/614

(58) Field of Search ................................ 356/429–431, 356/372, 375, 373, 237.1, 238.1, 238.2; 250/548, 559.01, 559.02, 559.03, 559.05, 559.06, 559.07, 559.08, 559.11, 559.12, 559.13, 559.15, 559.16

(56) References Cited

U.S. PATENT DOCUMENTS 4,959,040 A * 9/1990 Gardner et al. ............. 474/103
5,248,027 A * 9/1993 Kluger et al. ............ 198/502.4
5,291,245 A * 3/1994 Charnitski et al. .......... 355/208
5,565,965 A * 10/1996 Costanza et al. ........... 355/212
5,966,572 A * 10/1999 Mishra et al. .............. 399/160

* cited by examiner

*Primary Examiner*—Frank G. Font
*Assistant Examiner*—Michael P. Stafira
(74) *Attorney, Agent, or Firm*—Oliff & Berridge, PLC

(57) ABSTRACT

Systems and methods for determining the edge step and edge form of a test belt during production are provided. A gauge on a test belt provides belt edge information. A belt edge determination controller for a testing device determines the edge step and edge form of the test belt to stabilize or eliminate the steps on subsequently produced belts. The testing device includes a sensor mounted at one end of the belt module which sends sensor signals to the belt edge determination controller to determine the edge step and edge form of the belt. The belt edge determination controller then determines whether the determined edge step and edge form are appropriate for subsequent production. As the belt edge information varies, the belt edge determination controller compares the belt edge data to acceptable values and initialize the production values as the acceptable values to stabilize or eliminate the step during production

14 Claims, 9 Drawing Sheets

FIG. 1
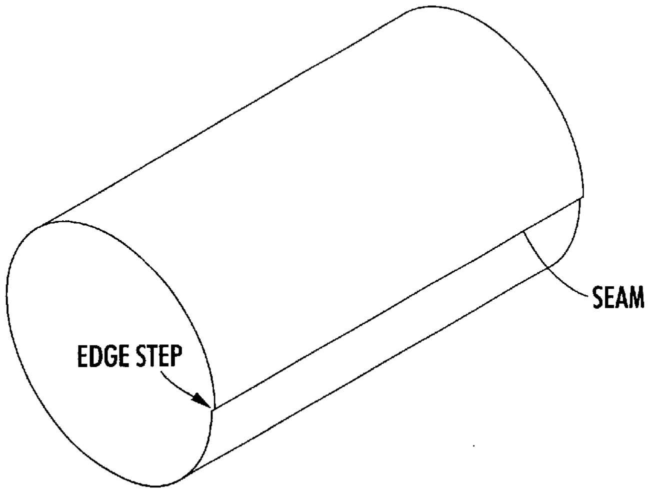
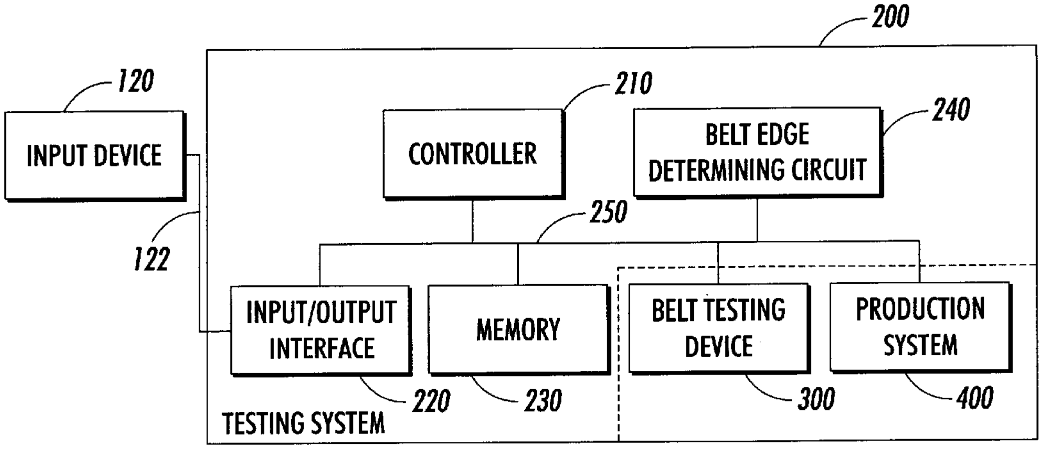
FIG. 2

FIG. 3
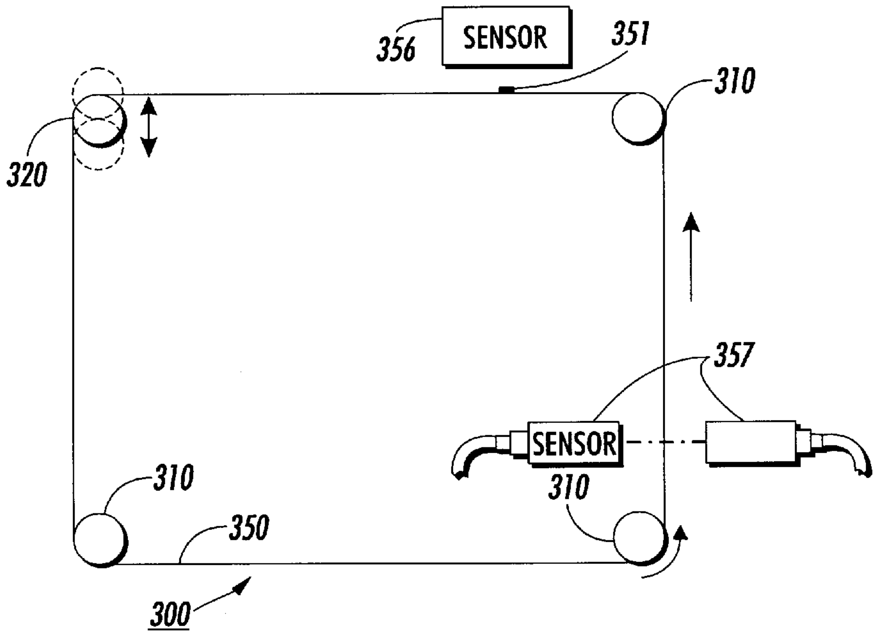
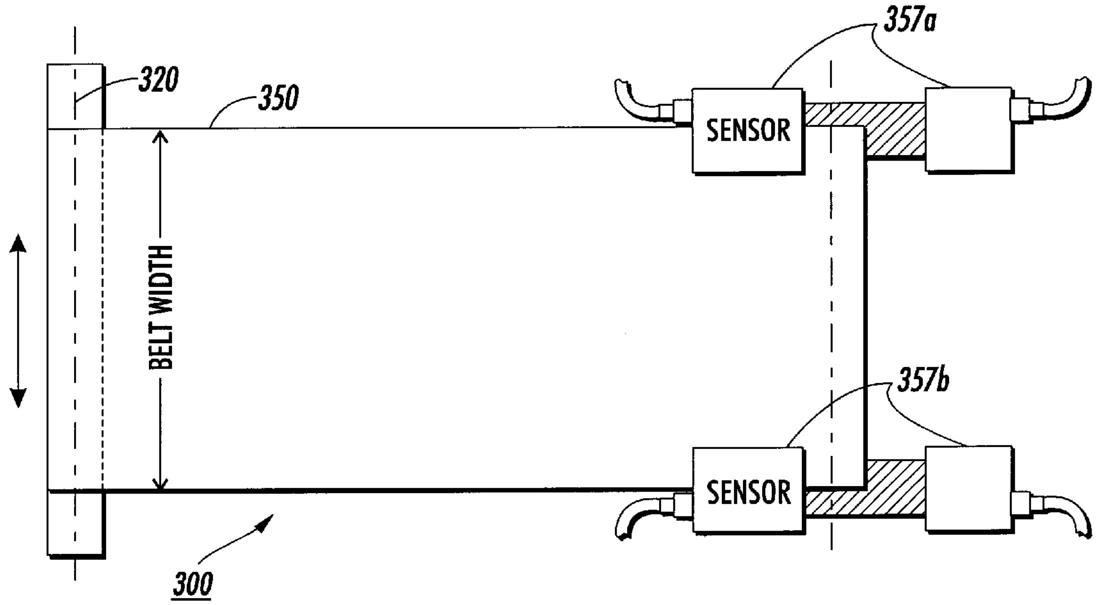
FIG. 4

FIG. 7
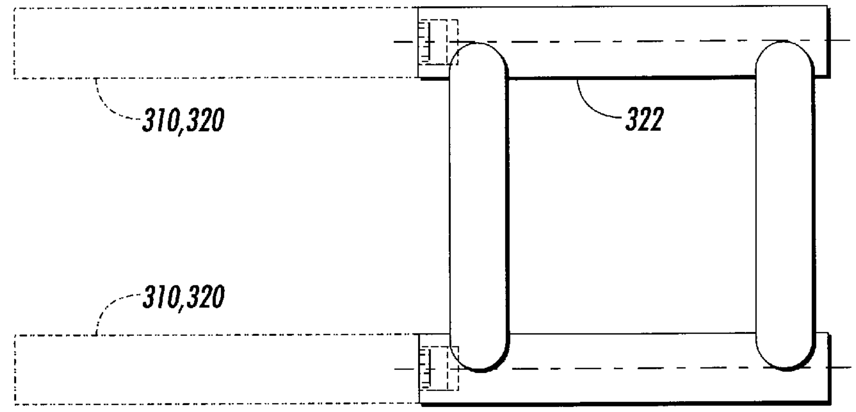
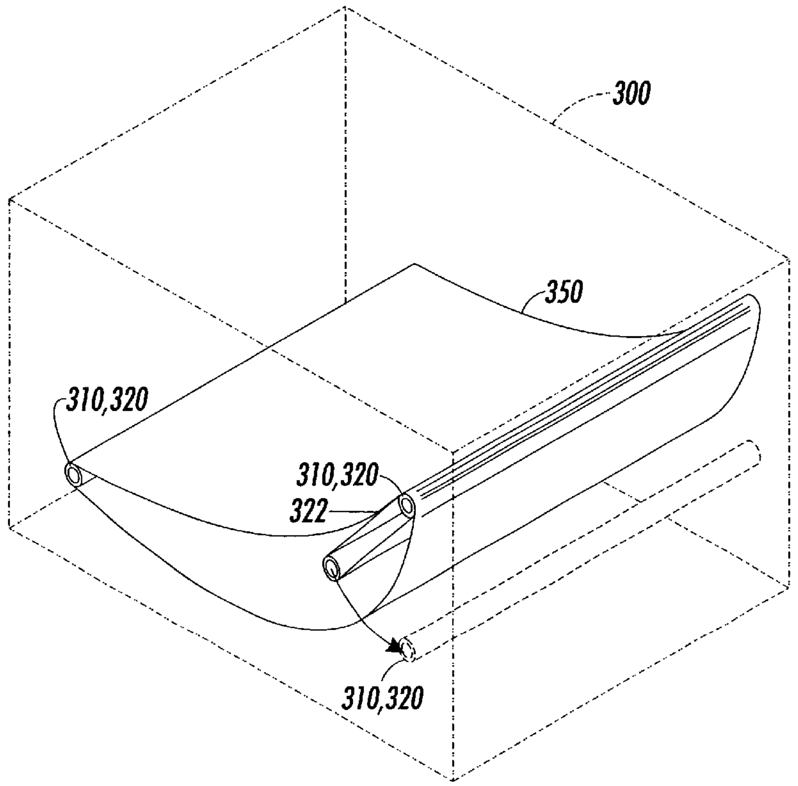
FIG. 8

FIG. 10
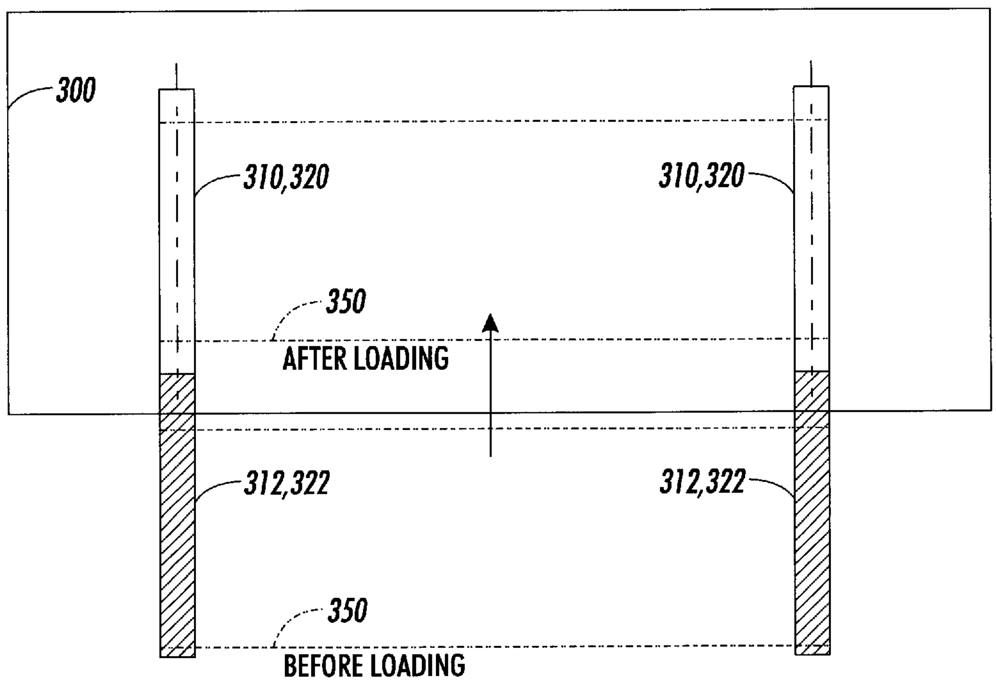
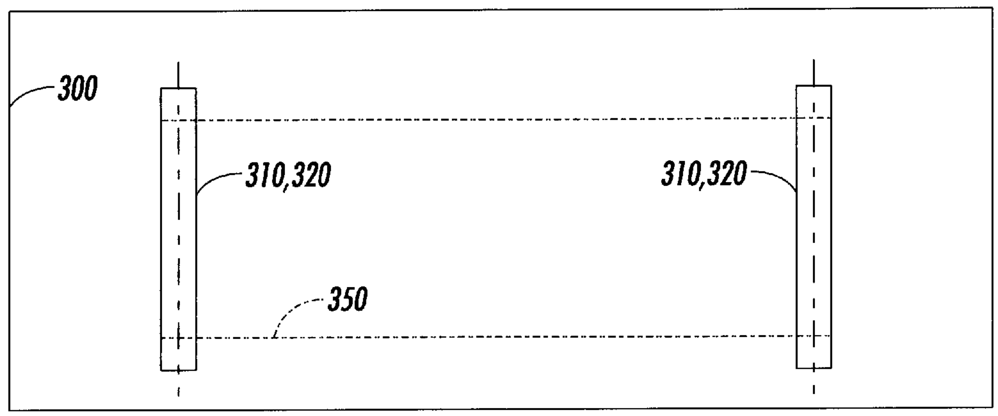
FIG. 11

BELT EDGE SENSOR

BACKGROUND OF THE INVENTION

1. Field of Invention

This invention relates to methods and systems that measure the edge step and edge form of a belt.

2. Description of Related Art

Electrophotography, a method of copying or printing documents, is performed by exposing a light image representation of a desired original image onto a substantially uniformly charged photoreceptor, such as a belt. In response to that light image, the photoreceptor discharges to create a latent image of the desired image on the photoreceptor's surface. Developing material, or toner, is then deposited onto the latent image to form a developed image. The developed image is then transferred to a final substrate, such as paper. The surface of the photoreceptor is then cleaned of residual developing material and recharged in preparation for the production of another image.

If the photoreceptor is an endless belt, the belt may be produced by aligning the two opposite edges of a planar sheet of photoreceptor material and then sealing together the aligned edges. The sealed area is called the seam.

SUMMARY OF THE INVENTION

As shown in FIG. 1, seams may be produced containing a step that is a discontinuous, or uneven, change in the belt edge profile. That is, the two edges of the belt to be sealed together may not be perfectly aligned due to, for example, waviness of the planar sheet. This edge step and the underlying waviness in edge form, if greater than a given acceptable value, could increase undesired registration offsets between color separation images in a developed multi-color image formed during a print run.

Registration offsets in a developed image are undesirable because, when the developed image is transferred to a final substrate, the final transferred image will include the registration offsets. That is, each different color separation image will be slightly misregistered, or offset, relative to the other color separation images and/or the receiving substrate. These registration offsets, even if only a few mils or tens of microns, are well within the visual acuity of the human eye.

Thus, the quality of the resulting image suffers greatly even for small steps and small amounts of waviness in the edge forms of the belt that are greater than the acceptable values. Without learning the edge step and edge form of the belt, the degree of registration between the color separation images cannot approach the level of quality necessary for good image production. Complex, independent control systems are employed to ensure good belt production.

This invention provides systems and methods for determining the edge step and edge form of a belt.

This invention separately provides at least one sensor on a test belt that is capable of providing belt edge information for producing subsequent belts.

This invention separately provides a belt edge determination controller for a testing device that uses the determined edge step and edge form of the test belt to reduce or eliminate the edge steps and waviness in edge forms on subsequently produced belts.

This invention separately provides systems and methods that determine edge information of a test belt along a belt moving direction during a test run to adjust the production data to remove or reduce the edge steps and waviness in edge forms during production.

The systems and methods of this invention separately provide sensors which provide feedback signals indicating the edge step and edge form of the test belt during a test run.

The systems and methods of this invention separately provide a controller that determines the differences between sensor feedback values to obtain belt edge data and compares the belt edge data to acceptable values, and to initialize the production data as the acceptable values to reduce or eliminate the step and waviness in edge form of during production of subsequent belts.

Various exemplary embodiments of the systems of this invention include a testing device that includes sensors mounted at one side of the belt module. The sensor signals are sent to a belt edge determination controller to determine the edge step and edge form of the test belt. Then, the belt edge determination controller determines whether a determined edge step and edge form data are appropriate for subsequent production.

In accordance with the systems and methods of this invention, problems in registration during a print run, such as misalignment, are reduced or eliminated.

These and other features and advantages of the systems and methods of this invention are described in or are apparent from the following detailed description o exemplary embodiments of the invention.

BRIEF DESCRIPTION OF THE DRAWINGS

The invention will be described in relation to the following drawings, in which reference numerals refer to like elements, and wherein:

FIG. 1 shows an exemplary test belt;

FIG. 2 shows one exemplary embodiment of system including a testing system in accordance with this invention;

FIG. 3 shows in greater detail a front view of one exemplary embodiment of the belt testing device of FIG. 1;

FIG. 4 shows in greater detail a top view of one exemplary embodiment of the belt testing device of FIG. 1;

FIGS. 5–9 illustrate one exemplary embodiment of a method for mounting the test belt onto the belt testing device of FIGS. 3 and 4;

FIG. 10 shows in greater detail one exemplary embodiment of the test belt in a mounted position;

FIG. 11 shows in greater detail a top view of one exemplary embodiment of the test belt in a loaded position;

DETAILED DESCRIPTION OF PREFERRED EMBODIMENTS

Figure 5:
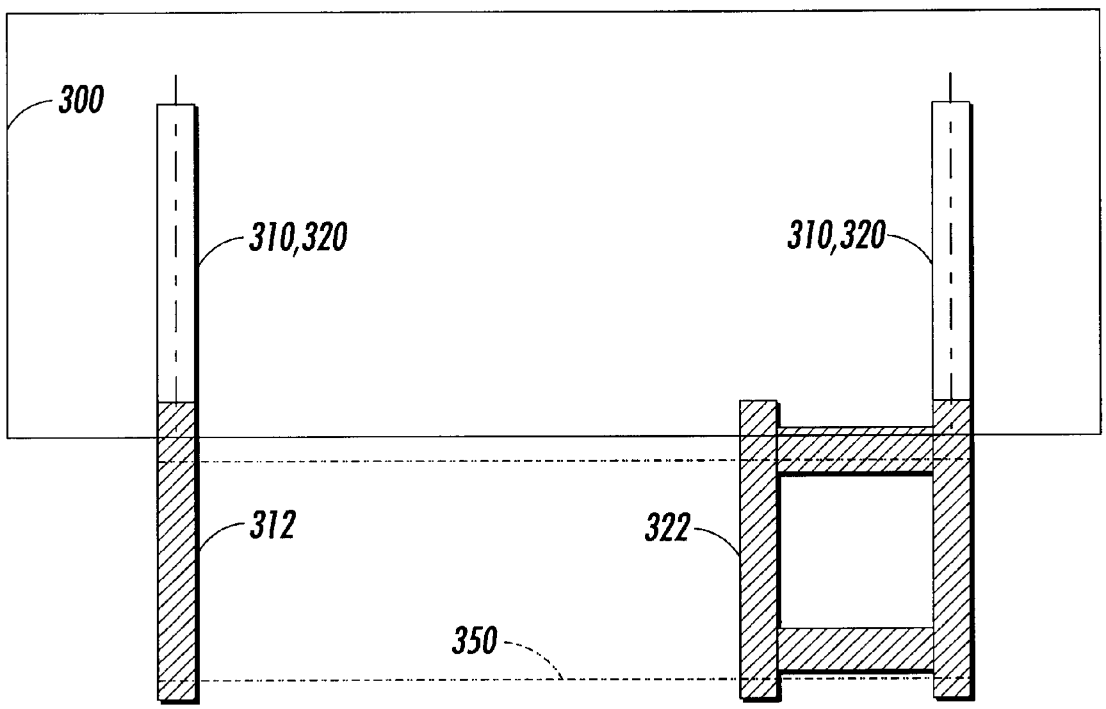

FIG. 2 shows one exemplary embodiment of a system including a testing system 200 in accordance with this invention. As shown in FIG. 2, the testing system 200 includes a controller 210, an input/output interface 220, a memory 230, a belt edge determining circuit 240, a belt testing device 300 and a production system 400, each of which is interconnected by a control and/or data bus 250. An input device 120 is connected to the input/output interface 220 over a link 122. Control and/or data signals from the input device 120 are input through the input interface 220, and, under control of the controller 210 are stored in the memory 230 and/or provided to the controller 210.

The input device 120 can be any known or later developed device for providing control information from a user to the testing system 200. Thus, the input device 120 can be a control panel of the testing system 200, or could be a control program executing on a locally or remotely located general purpose computer, or the like. The link 122 can be any known or later developed device for transmitting control signals and data input using the input device 120 from the input device 120 to the testing system 200.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a writable optical disk and disk drive, or any other known or later developed fixed or non-volatile memory device.

The belt edge determining circuit 240 inputs the determined data stored in the memory 230 for a desired edge profile of a test belt in the belt testing device 300, adjusts the test belt to the desired testing position by adjusting the position of one or more rollers of the belt testing device 300 on which the test belt is mounted, and obtains an indication whether the belt edge data for the test belt is appropriate for production of subsequent belts. The belt edge determining circuit 240 then outputs the indication to the production system 400 over the control and/or data bus 250.

While FIG. 2 shows the belt edge determining circuit 240, the belt testing device 300 and the production system 400 as portions of an integrated system, the belt edge determining circuit 240 could be provided as a separate device from the belt testing device 300 and the production system 400. That is, the belt edge determining circuit 240 may be a separate device attachable to a physically independent belt testing device 300 and/or a physically independent production system 400. For example, the belt edge determining circuit 240, and at least one edge sensor 357 and seam sensor 356 as shown in FIG. 3, may be devices which interface with the belt testing device 300 and/or the production system 400.

Furthermore, the belt edge determining circuit 240 may be implemented as software executing on the testing system 200. Other configurations of the elements shown in FIG. 2 may be used without departing from the spirit and scope of this invention.

It should be understood that the production system 400 can be any system that is capable of producing belts using the belt edge data generated according to the invention.

FIGS. 3 and 4 show one exemplary embodiment of the belt testing device 300 according to this invention. FIG. 3 shows a front view of the belt testing device 300 while FIG. 4 shows a top view of the belt testing device 300. As shown in FIG. 3, the belt testing device 300 includes a plurality of stationary rollers 310 and a movable roller 320. During a test run, a test belt 350 can be mounted around the rollers 310 and 320 to determine the belt edge profile of that test belt 350. The belt edge profile is determined using at least one edge sensor 357, and seam sensor 356 mounted around the test belt 350. Each edge sensor 357 includes at least one in-board sensor **357*a* and at least one out-board sensor 357*b*. The belt edge determining circuit 240 adjusts the test belt 350 to the desired testing position by adjusting the position of the movable roller 320. As shown in FIG. 3, the position of movable roller 320 is adjusted by moving at least one of the ends of the movable roller 320 in a plane perpendicular to the moving direction of the test belt 350. As shown in FIG. 4, the test belt 350 travels laterally with respect to the direction of the width of the belt width due to the movement of the movable roller 320**.

It should be appreciated that although FIGS. 3 and 4 show the belt testing device 300 as having three stationary rollers 310, any number of stationary rollers 310 may be used. In particular, the number of stationary rollers 310 may be varied in accordance with the belt size. For example, for a smaller test belt 350, only two stationary roller 310 may be needed. Thus, any number of stationary rollers 310 may be used in accordance with the methods and systems of this invention.

FIGS. 5–9 show one exemplary embodiment of mounting systems and methods for mounting the test belt 350 onto the belt testing device 300 according to this invention when at least two stationary rollers 310 are used. As shown in FIG. 5, at least one stationary extension 312 and at least one movable extension 322 are respectively attached to the ends of the rollers 310 and 320 outside of the belt testing device 300. The extensions 312 and 322 are attached to the end of the rollers 310 and 320 by slipping the extensions 312 and 322 over bearings (not shown) at one end of the rollers 310 and 320. The test belt 350 is loaded over the extensions 312 and 322 outside of the belt testing device 300.

Figure 6:
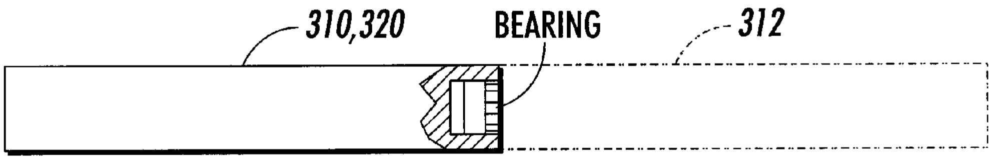

FIG. 6 shows in greater detail one exemplary embodiment of the stationary extension 312 while FIG. 7 shows in greater detail one exemplary embodiment of the movable extension 322. As shown in FIG. 6, a stationary extension 312 may comprise a single arm. The stationary extension 312 is attached to an end of a roller 310 or 320 by slipping one end of the extension 312 over a bearing at one end of the roller 310 or 320. The end of the stationary extension 312 which is to be attached to the roller 310 or 320 may have a pocket to receive the bearing.

As shown in FIG. 7, a movable extension 322 may comprise two arms connected in parallel. The movable extension 322 is attached to an end of one of the rollers 310 and 320 by slipping one end of one of the two arms of the extension 322 over a bearing at one end of the one roller 310 or 320. The end of the movable extension 322 on the arm which is to be attached to the one roller 310 or 320 may have a pocket to receive the bearing. The end of the movable extension 322 on the arm which is not attached to the one roller 310 or 320 may also have a pocket to receive a bearing of the other roller 310 and 320.

While FIGS. 5–7 show that the extension 312 is attached to one end of the roller 310 while the extension 322 is attached to one end of the roller 320, it should be appreciated that the extensions 312 are 322 can be attached to the rollers 310 and/or 320 in any desirable orientation. That is, it should be appreciated that the extension 312 may be attached to the movable roller 320 and the extension 322 may be attached to a fixed roller 310.

Figure 9:
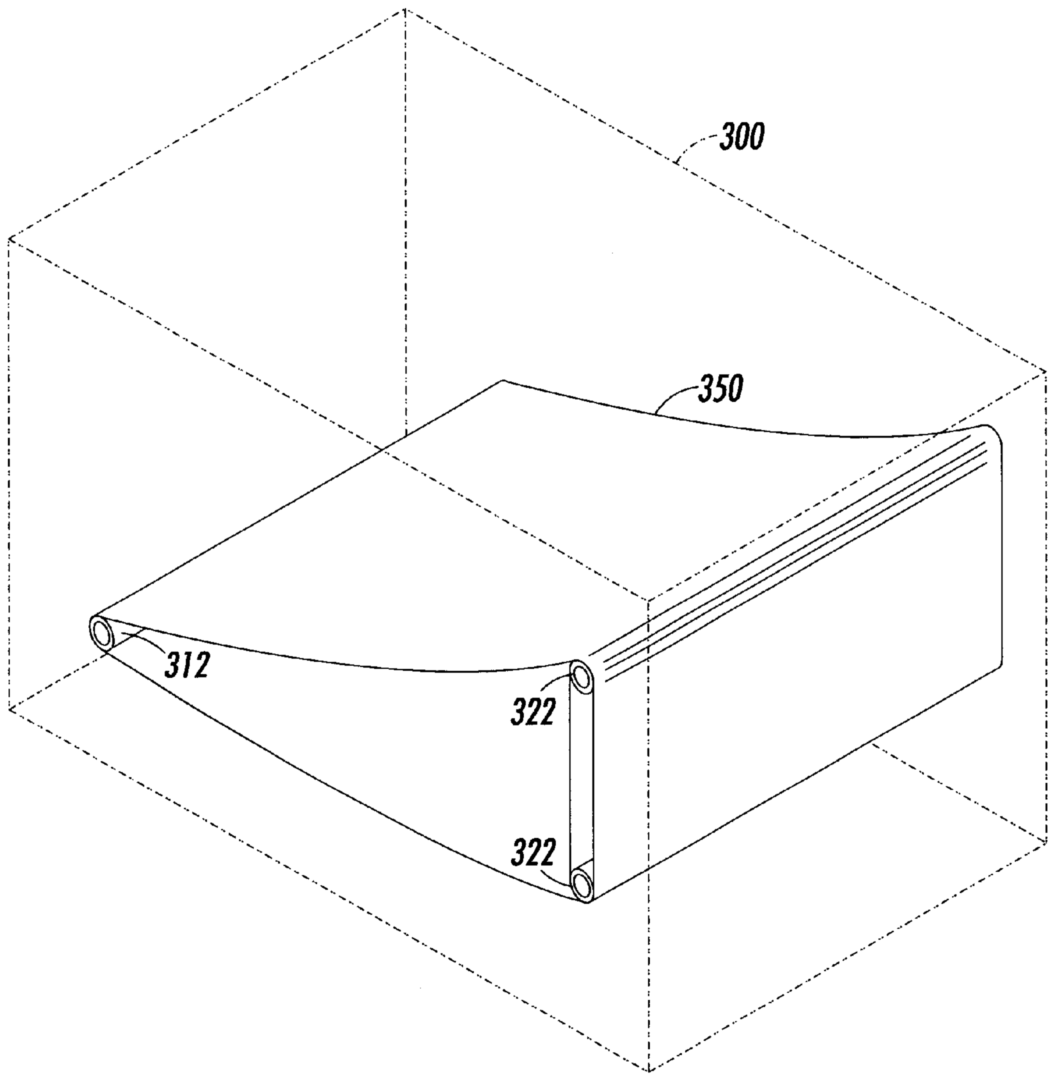

FIGS. 8 and 9 show in greater detail an exemplary embodiment of how the belt is mounted on and tightened on the belt testing device 300 according to the systems and methods of this invention. As shown in FIG. 8, as the test belt 350 is loaded onto the extensions 312 and 322, the movable extension 322 is in a loading position away from the roller 310 or 320. After the test belt 350 is loaded on the extensions 312 and 322, the extension 322 is rotated into a vertical, mounting, position, slipping the pocket of the unattached arm over the bearing of the other of the rollers 310 and 320. As shown in FIG. 9, when the extension 322 is rotated into the mounting position, the test belt 350 is tightened on the extensions 312 and 322 and locked into position before it is slid onto the rollers 310 and 320 inside the belt testing device 300.

Figure 12:
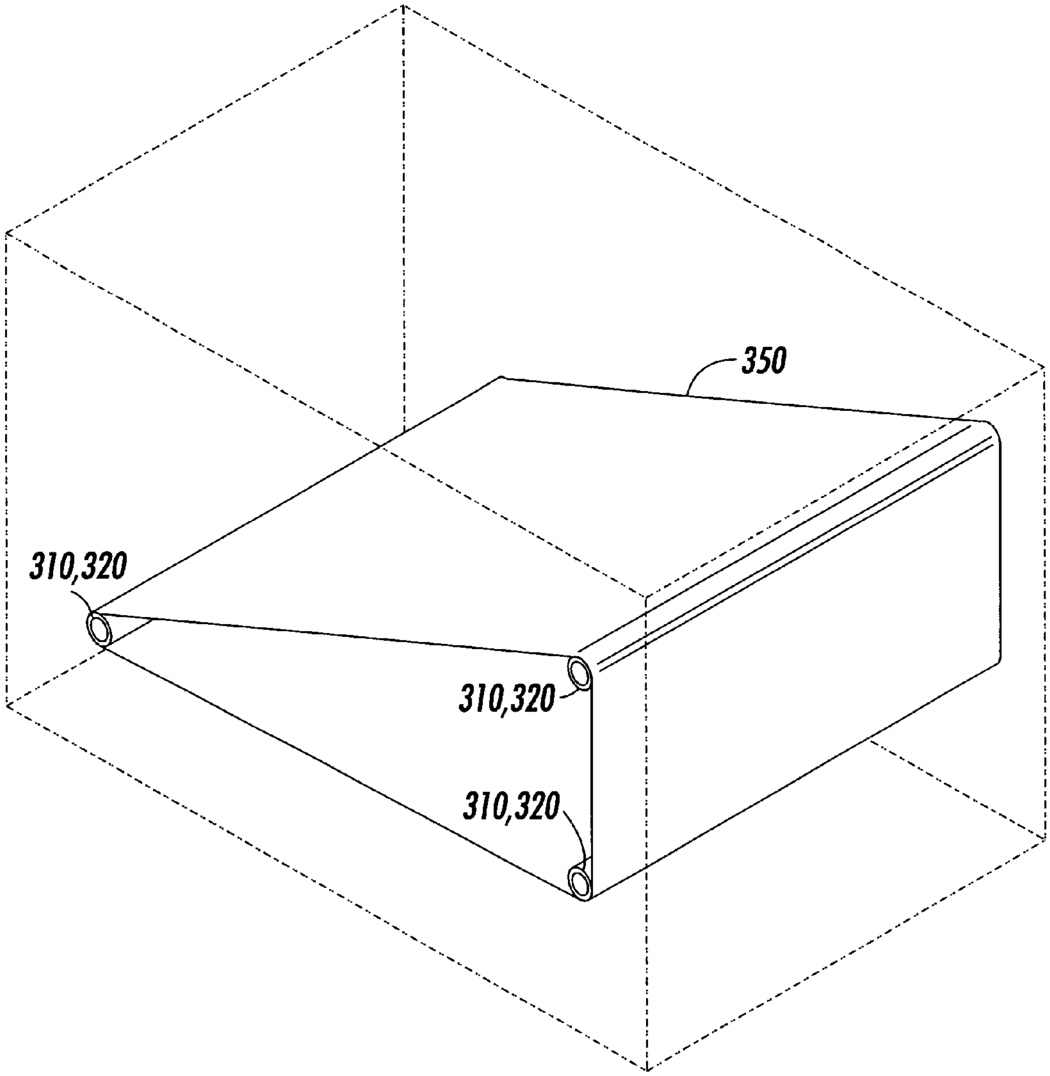
FIG. 12 shows in greater detail a front view of one exemplary embodiment of the test belt in a loaded position.

As shown in FIGS. 10–12, after tensioning, the test belt 350 is then pushed back onto the rollers 310 and 320 of the belt testing device 300 and locked into position ready for testing. FIG. 10 shows the positioning of the test belt 350 before and after being pushed back onto rollers 310 and 320. As shown in FIG. 11, after the test belt 350 is pushed back onto rollers 310 and 320, the extensions 312 and 322 are removed. The belt 350 can then be tested. Because the test belt 350 is first loaded onto the extensions 312 and 322 outside the belt testing device 300, mounting the test belt 350 onto the rollers 310 and 320 is facilitated and damage to the test belt 350 can be reduced.

As discussed above, it should be appreciated that any number of stationary rollers 310 may be applied. Accordingly, it should be appreciated that any number of the mounting extensions 312 and 322 corresponding to the rollers 310 and 320 may be used in accordance with the methods and systems of this invention.

It should also be appreciated that though FIGS. 5 and 6 show the extensions 312 and 322 as arms, the extensions 312 and 322 are not limited to this feature. Accordingly, it should be appreciated that any extensions that are capable of mounting and tightening the test belt 350 outside the belt testing device 300 may be used as the extensions 312 and 322 in accordance with the methods and systems of this invention.

Figure 13:
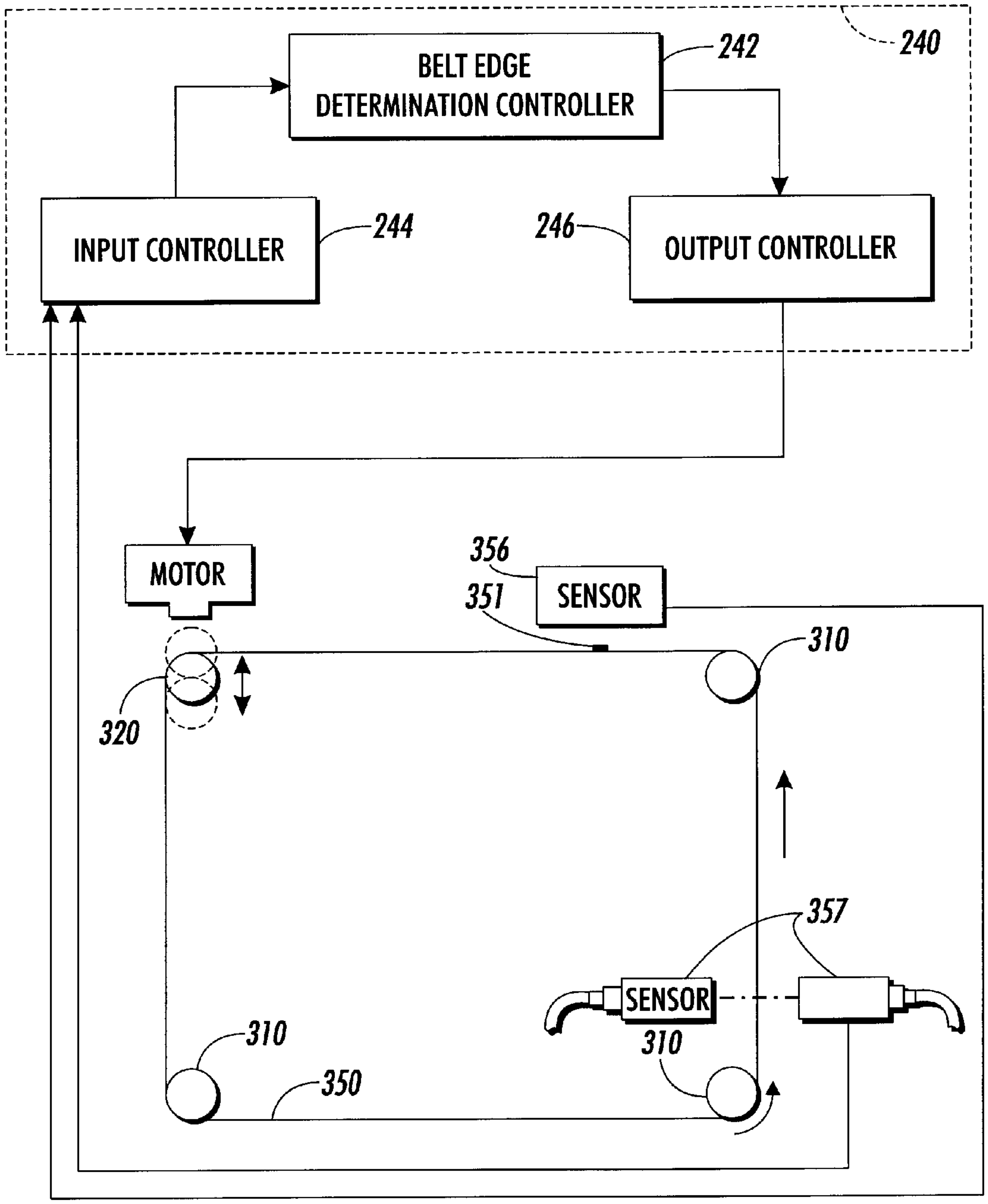
FIG. 13 shows in greater detail one exemplary embodiment of the belt testing device and the belt edge determining circuit shown in FIG. 1.

As shown in FIGS. 3, 4 and 13, the belt testing device 300 further includes at least one edge sensor 357 positioned on the test belt 350, and a seam sensor 356. Each registration sensor 357 can include, for example, one or more in-board sensors 357*a* and one or more out-board sensors 357*b*. The seam sensor 356 senses the position of the seam 351 on the test belt 350 at a fixed position. Each belt edge sensor 357 output signals indicative of the edge profile of the test belt 350 over the control and/or data bus 250 to the belt edge determining circuit 240. Similarly, the sensor 356 output signals indicative of the seam 351 of the test belt 350 over the control and/or data bus 250 to the belt edge determining circuit 240. The belt edge determining circuit 240 then determines the edge profile of the test belt 350 at the particular belt edge sensor positions, respectively.

The in-board sensor 357*a* detects a first edge of the test belt 350 while the out-board sensor 357*b* detects a second edge of the test belt 350. Differences in the components between the one or more in-board sensors 357*a* and the one or more out-board sensors 357*b* may be used by the belt edge determining circuit 240 to determine the edge step and edge form of the test belt 350.

The edge determining circuit 240 determines the edge step and edge form by comparing the differences in components between the one or more in-board sensors 357*a* and the one or more out-board sensors 357*b* along test belt 350. By obtaining the difference in components at separate locations along the test belt, a jump in variance can be determined. The jump in variance is determined as the edge step of the test belt 350. That is, at the edge step of the belt 350, there is an abnormality in the data collected. Thus, this abnormality will provide a jump in the variance. The edge form of the test belt 350 is determined as the variance data collected along the test belt 350.

The belt edge determining circuit 240 relies on its knowledge of the moving direction position of the test belt 350, relative to the seam detected using the seam sensor 356 and the values determined using the at least one belt edge sensor 357, to both learn the edge step and edge form of the test belt 350. For the belt edge determining circuit 240 to work properly, the detected values of the test belt 350 must be synchronized with the moving-direction position of the test belt 350.

Using the determined differences in the edge profile detected by the at least one belt edge sensor 357, the belt edge determining circuit 240 generates a plot of the differences for each rotation of the test belt 350. The belt edge determining circuit 240 controls the lateral movement of the test belt 350 in order to obtain the accurate determination of the edge step and edge form. In one exemplary embodiment, the belt edge determining circuit 240 compares two consecutive plots for exactness to determine whether the movement of the test belt 350 is zero. That is, when one plot is laid on top of the other plot, the two plots are compared for exactness to determine whether the movement of the test belt 350 is zero. The belt edge determining circuit 240 then controls a motor which controls the movement of the movable roller 320 to obtain the desired position of the test belt 350 where lateral movement of the test belt 350 is zero.

The edge step and edge form data is collected when the test belt 350 is adjusted so that is lateral movement is zero, i.e., under a controlled condition. In one exemplary embodiment, the belt edge determining circuit 240 generates an edge profile table. These measurements of the edge profile, which are used to determine the edge step and edge form of the test belt 350, are stored in the edge profile table for each position of the test belt 350 along the moving-direction relative to the seam 351.

The edge profile table is obtained during a test run of the testing system 200. During the test run, the belt edge determining circuit 240 collects data on the nominal profile of the edge of the test belt 350 at the at least one belt edge sensor 357 for each position along the test belt 350 with respect to the detected seam 351. The belt edge determining circuit 240 stores the nominal profile in the edge profile table. The edge profile table has one entry for each sample position along the test belt 350.

FIG. 13 shows in greater detail one exemplary embodiment of the belt testing device 300 and the belt edge determining circuit 240 shown in FIG. 1. As shown in FIG. 13, the belt edge determining circuit 240 includes a belt edge determination controller 242, an input controller 244, and an output controller 246. The output controller 246 controls the output to the movable roller 320 to adjust the position of the test belt 350. The input controller 244 receives the signals output from the at least one belt edge sensor 357 and the seam sensor 356.

The at least one belt edge sensor 357 senses the edge profile of the edge of the test belt 350 at the two positions. The sensed edge profile is input to the input controller 244. The seam sensor 356 senses the arrival of the seam 351 on the test belt 350 and outputs a seam sensor signal to the input controller 244.

Upon the seam sensor signal indicating the arrival of the seam 351 at the predetermined position, the seam sensor signal is input to the input controller 244 and the belt edge determination controller 242 determines the actual lateral movement of the test belt 350 based on the determined position of the test belt 350 at the at least one belt edge sensor 357 relative to the position of the seam 351. The belt edge determination controller 242 then uses the data to generate a plot for each rotation of the test belt 350 and to compare two consecutive plots for exactness. The output controller 246 then controls the motor to the movable roller 320 to control the position of the belt to obtain two exact consecutive plots. That is, the output controller 246 adjusts the movement of the test belt 350 to a controlled condition of zero movement. At this point of controlled condition, the belt edge determination controller 242 uses the latest plot or next plot to obtain the edge step and edge form.

FIG. 4 shows one exemplary embodiment of the at least one belt edge sensor 357. As shown in FIG. 4, a laser beam is directed from the top edge to the bottom edge of the sensor 357. As the test belt 350 passes between the two edges of the sensor 357, the loss in light is detected. Because the loss in light varies with the various positions on the test belt 350, the difference in light loss at two separate locations can be detected. Thus, in plotting the data of the detection result, the jump in variance is detected as the edge step of the test belt 350. Furthermore, because the data plot represents the waviness in the test belt 350, the data plot represents the edge form of the test belt 350.

Figure 14:
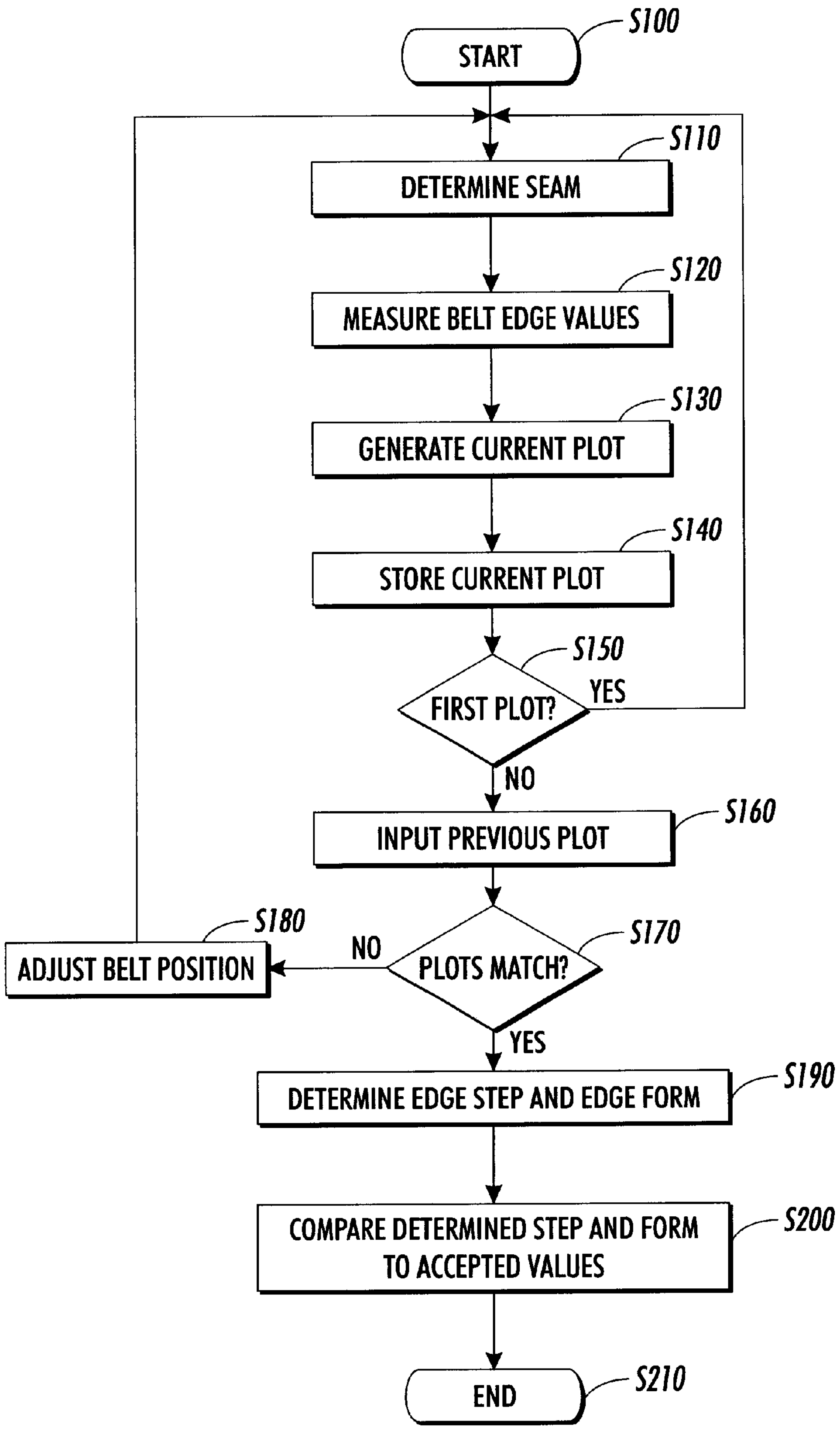
FIG. 14 is a flowchart outlining one exemplary embodiment of the method for testing the test belt.

FIG. 14 is a flowchart outlining one exemplary embodiment of the method for testing the test belt. Beginning at step S100, control continues to step S110, where the arrival of the seam is determined. Next, in step S120, the belt edge values of the belt are measured. Then, in step S130, a current data plot is generated based on the measured belt edge values at the position relative to the seam. Control then continues to step S140.

In step S140, the current data plot is stored. In step S150, a determination is made whether the current plot is the first plot. If the current plot is the first plot, control returns to step S100. Else, there is a previous plot, and control continues to step S160. Next, in step S160, the previous plot is input. Then, in step S170, the current data plot is compared to the previous data plot to determine whether the current data plot matches the previous data plot. If the data plots match, the control condition is obtained and control jumps to step S190. Else, control continues to step S180, In step S180, the belt position is adjusted to the control position. Control then returns to step S110.

In step S190, the edge form and edge step are measured. Then, in step S200, the edge form and edge step are compared to acceptable values and an indicator is output which indicates whether the production data is acceptable. Control then continues to step S210, where the method ends.

As shown in FIG. 1, the testing system 200 is preferably implemented on a programmed general purpose computer. However, the testing system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowchart shown in FIG. 6, can be used to implement the testing system 200.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

While this invention has been described in conjunction with the exemplary embodiments outlined above, it is evident that may alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, it should be appreciated that this invention need not only be used to determine edge steps and edge forms for a photoreceptor belt. Thus, it should be appreciated that various other modifications and changes may occur to those skilled in the art without departing from the spirit and scope of this invention.

What is claimed is:

1. A method for determining a property of a belt, to allow for non-linear belt motion, comprising:

determining an arrival of a predetermined feature on the belt;

determining at least one belt edge value of the belt;

generating at least two consecutive plots including a previous data plot for a previous plot and a current data plot for a current plot based on the at least one determined belt edge value at positions relative to the predetermined feature;

comparing the current data plot to the previous data plot, wherein if the current data plot does not match the previous data plot, the belt is adjusted to compensate for non-linear motion along the length of the belt; and continuing to generate data plots, comparing the current data and previous data plot and adjusting the belt until the current data plot matches the previous data plot so that a control condition is obtained in which non-linear motion along the length of the belt has been eliminated.

2. The method of claim 1, further comprising determining an edge step of the belt based on the current data plot in the control condition.

3. The method of claim 1, further comprising determining an edge form of the belt based on the current data plot in the control condition.

4. The method of claim 1, further comprising storing the current data plot.

5. The method of claim 1, wherein the predetermined feature is a seam.

6. A system for determining a property of a belt, to allow for non-linear belt motion, comprising:

a predetermined feature determining device that determines an arrival of a predetermined feature on the belt;

a belt edge value determining device that determines belt edge values of the belt;

a plot generator that generates a current data plot for a current plot based on the determined belt edge values at positions relative to the predetermined feature;

a first plot determining device that determines whether the current data plot is a first plot;

a previous data plot input device that, if the current plot is not the first plot, inputs a previous data plot; and a comparator that compares the current data plot to the previous data plot, wherein if the current data plot does not match the previous data plot, the belt is adjusted to eliminate the non-linear movement along the length of the belt and further generates and compares data plots until the current data plot matches the previous data plot, and establishes a control condition when the previous data plot matches the current data plot so that non-linear movement along the length of the belt is eliminated.

7. The system of claim 6, further comprising an edge step determining device that determines an edge step of the belt on the current data plot in the control condition.

8. The system of claim 6, further comprising an edge form determining device that determines an edge form of the belt based on the current data plot in the control condition.

9. The system of claim 6, further comprising a memory that stores the current data plot.

10. The system of claim 6, wherein the predetermined feature is a seam.

11. The system of claim 6, further comprising at least one movable roller to control the motion of the belt to allow for non-linear belt motion.

12. The system of claim 6, further comprising belt loading tools.

13. The system of claim 12 wherein the belt loading tools comprise at least one movable extension and at least one stationary extension.

14. The system of claim 11, further comprising:

at least one stationary roller for holding the belt during testing;

belt loading tools, comprising at least one movable extension and at least one stationary extension;

the at least one movable extension being attached to at least one movable roller; and the at least one stationary extension being attached to at least one stationary roller.

* * * * *